S. W. POWELL.
Bark Mill.
No. 12,487.
Patented March 6, 1855.
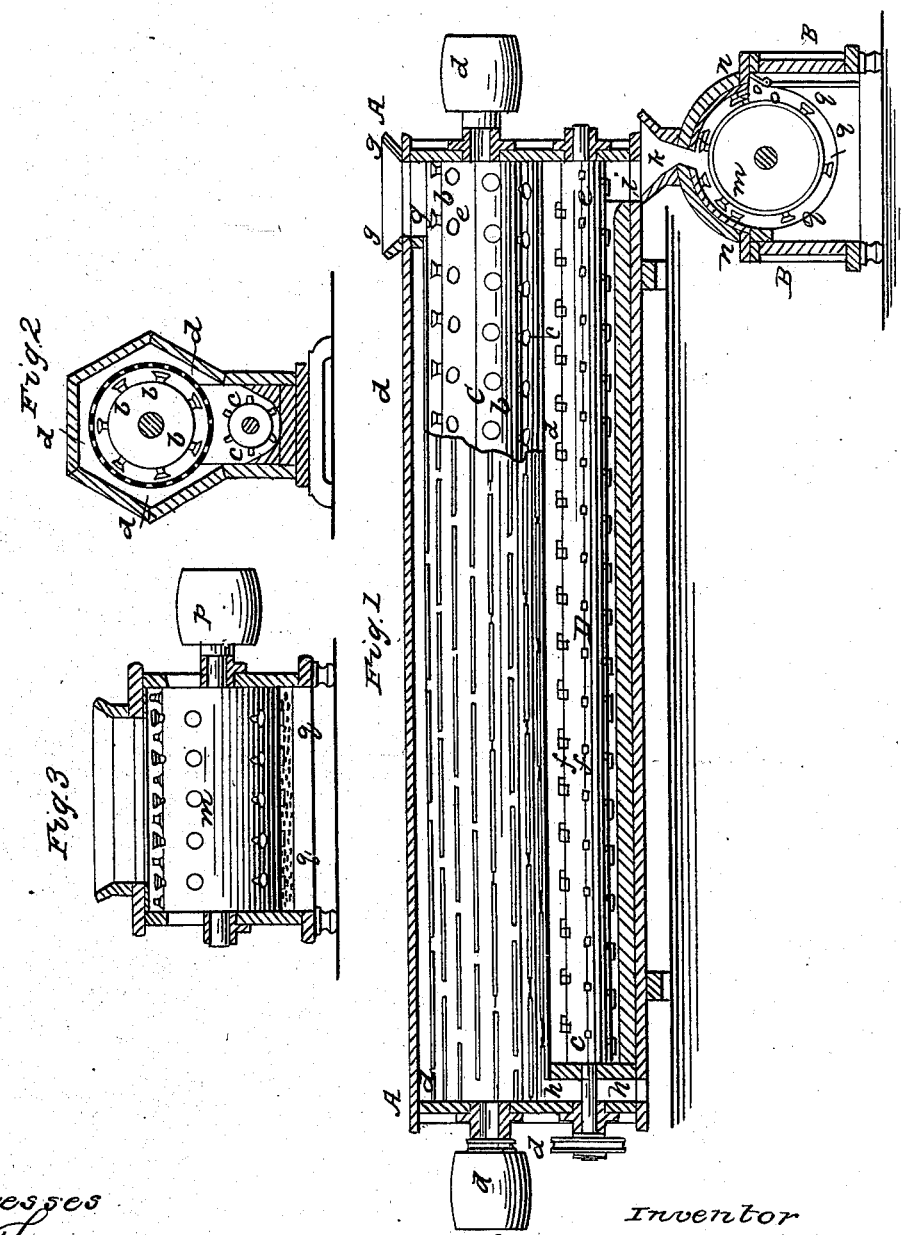

UNITED STATES PATENT OFFICE.

SAMUEL W. POWELL, OF TUSCARORA VALLEY, PENNSYLVANIA.

MILL FOR GRINDING AND BOLTING SUMAC.

Specification of Letters Patent No. 12,487, dated March 6, 1855.

*To all whom it may concern:*

Be it known that I, SAMUEL W. POWELL, of Tuscarora Valley, in the county of Juniata and State of Pennsylvania, have invented a new and Improved Machine for Screening, Cleaning, and Grinding Sumac and other Articles; and I do hereby declare the following is a full and exact description thereof, reference being had to the accompanying drawings and to the letters of reference marked thereon.

The nature of my invention consists of a frame containing two cylindrical bars which revolve, the upper bar having a series of cutters set in a spiral position around it, and inclosed in a hollow cylinder or sheath, perforated with slots; and the lower bar having projections from its surface and in a spiral direction. In the under side of the frame are two outlets, out of one of which passes the leaves of sumac, or other article, into a hopper and thence down into a frame supporting a cylinder arranged with cutters, the inner upper side of said frame also having stationary cutters, and the space below and at the sides of the cylinder closed with a fine sieve plate through which the fine particles of sumac eventually pass.

To enable others skilled in the art to make and use my invention I will proceed to describe its construction and operation.

A frame, suitable for the purpose of supporting and inclosing the cylinders—as A, B Figure 1, is constructed so as to leave a space between the slotted hollow cylinder or sheathing—$a$ Fig. 1—and it. A large cylinder, $b$, Fig. 1, and a smaller one, $c$, Fig. 1, are placed in this frame, having drums upon the production of their axes. These drums, $d$, Fig. 1, are for the application of power. Upon the surface of the upper cylinder, $b$, Fig. 1, and arranged spirally, are cutters $e$, Fig. 1. These cutters are conical in shape having their base outward. Projecting from the surface of the lower cylinder are teeth also arranged spirally. Slotted hollow cylinder or sheathing—a section shown at $a$, Fig. 1—is fitted at the ends into the frame and envelopes the upper cylinder—$b$, Fig. 1—and has an opening—at $g$, Fig. 1—directly under the hopper or that aperture in the frame through which the material to be acted upon is introduced into the machinery. At the opposite end of this sheathing, but underneath, is another aperture—at $h$, Fig. 1.

There is a space allowed between the lower cylinder, $c$, Fig. 1, and the frame, and an aperture in the lower side of the frame, at $i$, Fig. 1, directly beneath the hopper, $g$, Fig. 1. This aperture communicates with another hopper, $k$, Fig. 1, of a small frame which supports a cylinder—$m$, Figs. 1 and 3—actuated at right angles with the two upper or above mentioned cylinders. This cylinder has conical cutters projecting from its surface, and its upper surface is covered by a cap, $n$, Fig. 1, having conical cutters projecting from its surface, and so arranged with reference to those on the cylinder—$m$, Fig. 1—as not to interfere with them in the revolution of the cylinder. This cap, $n$, Fig. 1, has a slot or aperture in the top so as to allow materials to pass through the hopper, $k$, Fig. 1, and upon the cylinder, $m$, Fig. 1. Around this cylinder, $m$, Fig. 1, and below the cap is a fine sieve, $q$, Fig. 3, and so fitted to the frame and around the cylinder as to allow the latter to revolve freely. There is a small gate, $o$, Fig. 1 on the side of the cylinder, $m$, Fig. 1, and directly under the cap $q$, Fig. 1, and at the upper edge of the sieve. The cylinder, $m$, Figs. 1 and 3, has a drum, $p$, Fig. 3, upon the production of its axis, for the application of power.

I will now describe the operation of screening, cleaning, and grinding sumac and other articles by the above machinery. To illustrate we will employ the article of sumac. It is placed in the hopper, $g$, Fig. 1, and thence passes upon the cylinder, $b$, Fig. 1, and between it and the hollow cylinder or slotted sheathing, $a$, Fig. 1. The action of the cutters, $e$, Fig. 1, soon reduces it, and the stems and coarse parts are forced or carried along to the opposite end of the cylinder and pass down through the aperture, $h$, Fig. 1, and thence out of the frame. The leaves reduced by the cutters pass through the slots, of the hollow cylinder or sheathing into the chamber below and upon the conducting shaft, $c$, Fig. 1, and by its motion are carried to the aperture, $i$, Fig. 1, in the frame communicating with the third or lower cylinder, $m$, Figs. 1 and 3. The material passing through this aperture falls upon the cylinder, $m$, Figs. 1 and 3, and is reduced to powder by the action of the cutters on the cylinder and those, *q*, Fig. 1, upon the cap. The powdered particles pass or escape through the sieve, *q*, Fig. 1, and the result is ready for use. Thus is performed the whole operation of screening, cleaning, grinding and bolting. Should pebbles or other hard substance get into the machine they are allowed to pass off through the small gate, *o*, Fig. 1, just above the sieve, and which may be opened or closed at will by a small thumb screw or otherwise.

What I claim as my invention and desire to secure by Letters Patent is—

The slotted hollow cylinder having a shaft armed with spirally arranged teeth revolving within it, constructed and arranged in the manner and for the purpose herein set forth and disclaiming all other parts not herein claimed.

SAMUEL WHARTON POWELL.

In presence of—
   GEO. C. THOMAS,
   P. K. THOMAS.